April 2, 1940.                L. J. ZAHARAKO                2,195,951
                            FRUIT CUTTING SUPPORT
                              Filed May 2, 1939
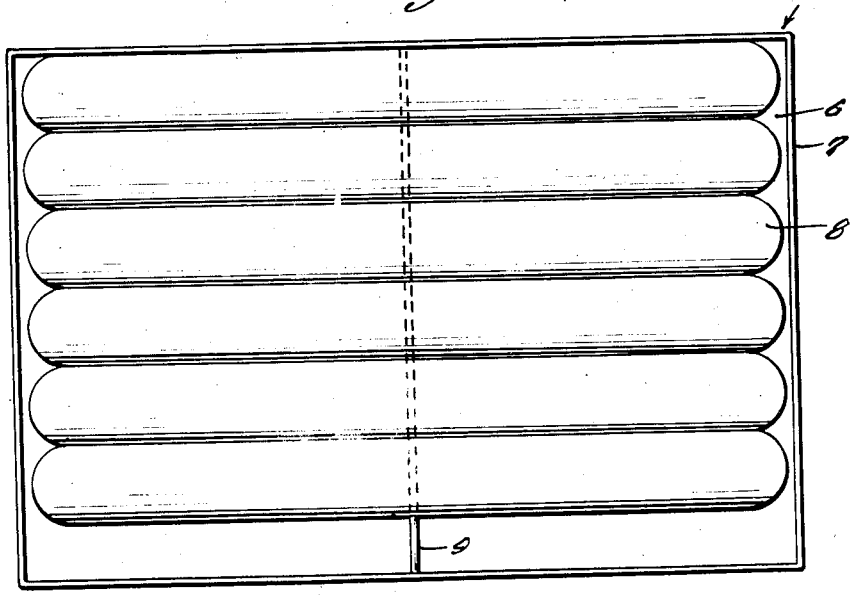
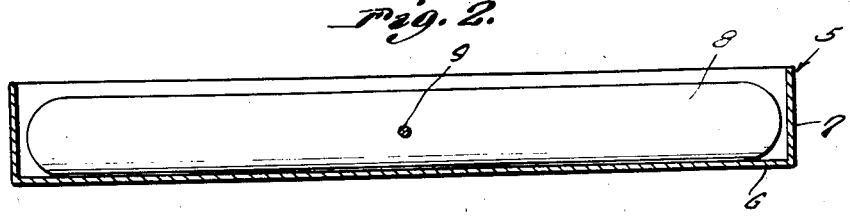
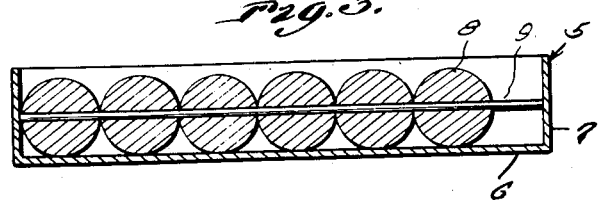
Inventor
L. J. Zaharako
By Clarence A. O'Brien
and Hyman Berman
Attorneys Patented Apr. 2, 1940

2,195,951

UNITED STATES PATENT OFFICE 2,195,951

FRUIT CUTTING SUPPORT

Lewie James Zaharako, Columbus, Ind.

Application May 2, 1939, Serial No. 271,413

1 Claim. (Cl. 146—215)

This invention relates to fruit cutting supports, and has for the primary object, the provision of a device of this character which will have an efficient supporting surface on which fruit, such as lemons, oranges, grapefruit, etc., may be cut, the construction thereof presenting a grooved surface through the employment of a plurality of interchangeable cylindrical members coacting in defining the grooved surface and which will not clog with fruit pulp or the like during the use of the device and which will not warp out of shape in that expansion and contraction of the members will be cared for through the mounting therefor, the latter acting as a medium for the catching of juices to prevent the spilling and wasting thereof.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a fruit cutting support constructed in accordance with my invention.

Figure 2 is a vertical sectional view illustrating the device.

Figure 3 is a transverse sectional view illustrating the device.

Referring in detail to the drawing, the numeral 5 indicates a tray of substantially rectangular shape and constructed of stainless steel or any other material suitable for the purpose and includes a bottom wall 6 and upstanding walls 7.

Located in the tray is a plurality of cylindrical members 8 the length of which is slightly less than the length of the tray and each is transversely bored intermediate its ends to receive a tie rod 9 carried by opposite walls of the tray and removable therefrom. The tie member 9 maintains the members 8 in proper relation to each other to present a surface on which fruit, such as lemons, oranges, grapefruit, etc., may be cut without the danger of the fruit slipping or rolling off of the surface. The members 8 being of cylindrical formation define therebetween a plurality of longitudinal grooves which will not readily become clogged with fruit juices, pulp and the like. Sufficient space is provided between the upstanding walls and the members 8 to permit expansion and contraction of said members. It is preferable that the members 8 be constructed of a suitable wood and when saturated with fruit juices naturally will expand and due to the spacing of these members as before described with respect to the tray the expansion can take place readily without the members warping out of shape.

After the device has been in use for a period of time and if certain of said members become worn their position within the tray may be changed with other members which have not received so much wear through the removal of the tie member 9 from the tray and said members and the reinserting of the tie member in the members and the tray after said members have been shifted with respect to each other. It is preferable that the ends of the members 8 be rounded which will provide additional spaces for fruit juices to flow from the cutting surface into the tray, the latter acting as a catch basin for the juices to prevent waste or spilling thereof.

A device of this construction besides providing an extremely efficient support for the cutting of fruit can be readily cleansed and kept in a sanitary condition through the mounting of the members 8 in the tray which will permit said members to be removed for cleaning purposes and also to permit the interior of the tray to be thoroughly cleansed.

It is believed that the foregoing description, when taken in connection with the drawing will fully set forth the construction and advantages of this invention to those skilled in the art to which such a device relates, so that further detailed description will not be required.

What I claim is:

A device of the character set forth comprising a tray, a plurality of cylindrical members arranged in said tray and paralleling each other and coacting to present a cutting surface including a series of grooves, and a tie member extending through the members intermediate the ends of the latter and removably connected with opposite walls of the tray, said members having sufficient play between the walls of the tray to permit the members to expand and contract without warping.

LEWIE JAMES ZAHARAKO.